US007975044B1

(12) United States Patent
Spatscheck et al.

(10) Patent No.: US 7,975,044 B1
(45) Date of Patent: Jul. 5, 2011

(54) AUTOMATED DISAMBIGUATION OF FIXED-SERVERPORT-BASED APPLICATIONS FROM EPHEMERAL APPLICATIONS

(75) Inventors: Oliver Spatscheck, Randolph, NJ (US); Subhabrata Sen, New Providence, NJ (US); Jacobus E. Van der Merwe, New Providence, NJ (US); Patrick McDaniel, State College, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 904 days.

(21) Appl. No.: 11/317,256

(22) Filed: Dec. 27, 2005

(51) Int. Cl.
 *G06F 15/173* (2006.01)
(52) U.S. Cl. ........................................ 709/224
(58) Field of Classification Search .................... 709/224
 See application file for complete search history.

(56) References Cited

U.S. PATENT DOCUMENTS

| 6,263,337 | B1* | 7/2001 | Fayyad et al. .................. 1/1 |
| 7,209,473 | B1* | 4/2007 | Mohaban et al. ............ 370/352 |
| 7,444,408 | B2* | 10/2008 | Rajavelu et al. ............. 709/227 |
| 2003/0061577 | A1* | 3/2003 | Saluja et al. ...................... 716/2 |
| 2004/0059830 | A1* | 3/2004 | Brown .......................... 709/238 |
| 2005/0234920 | A1* | 10/2005 | Rhodes ........................... 707/10 |
| 2006/0067220 | A1* | 3/2006 | Poletto et al. .............. 370/230.1 |
| 2006/0212569 | A1* | 9/2006 | Ammerman et al. ......... 709/224 |
| 2007/0011317 | A1* | 1/2007 | Brandyburg et al. ......... 709/224 |

OTHER PUBLICATIONS

Estan, C. et al Automatically Inferring Patterns of Resource Consumption in Network Traffic. Proceedings of the 2003 conference on Applications, technologies, architectures,and protocols for computer communications, Aug. 25-29, 2003, pp. 137-148. (abstract) ACM [online], Karlsruhe Germany [retrreived on Dec. 15, 2009]. Retrieved from ACM Portal USPTO.*

* cited by examiner

*Primary Examiner* — Rupal D Dharia
*Assistant Examiner* — Tom Y Chang
(74) *Attorney, Agent, or Firm* — Hope Baldauff Hartman, LLC

(57) ABSTRACT

Provided are methods for partitioning communication data in a network and disambiguating fixed or non-ephemeral communication data from ephemeral communication data and services. In one example, kmeans data clustering is used to partition or cluster server ports based on a location of the server ports in a 2-dimensional space. The location of the server ports may be based on a number of connections per server port and the number of servers using that port.

8 Claims, 5 Drawing Sheets

AUTOMATED DISAMBIGUATION OF FIXED-SERVERPORT-BASED APPLICATIONS FROM EPHEMERAL APPLICATIONS

FIELD OF THE INVENTION

The invention relates generally to application identification. More specifically, the invention provides for improved identification and characterization of applications in a network.

BACKGROUND OF THE INVENTION

Networks today have become increasingly complex such that service mapping within such networks have become cumbersome. In an enterprise network, for example, additional applications may be added to the network. As additional applications are run on the network, additional information regarding these applications such as traffic measurements and mappings of the applications may become unwieldy. As a result, such information often becomes outdated as network system administrators become increasingly unable to keep up with mapping the traffic within the network. This problem is compounded by the rapid proliferation of new applications as well as the merger of companies and their corresponding disparate networks. As multiple networks merge into one the wealth of new applications continues to grow. This problem is further exacerbated by the ease and frequency with which a user may add new applications to the network traffic. This results in a "knowledge gap" in which network applications are harder to identify and track.

Each application running on a network may be associated with a type. One characteristic of an application in a network is the port numbers used for communication. For example, an application may communicate via a fixed server port number whereas other applications may communicate via random or dynamically assigned port numbers. The dynamically assigned port numbers may be determined at the time of use. Differentiation between the different types of applications and the different modes of communication associated with the different type of applications may enhance the usability and/or security of the communication. However, there is currently no effective means of differentiating types of communication such as between communication via a fixed server port number and communication via dynamically assigned or random port numbers.

Thus, there exists a need for a method and system for differentiating between communications that use fixed server port numbers and communications that use non-fixed server port numbers such as random port numbers or dynamically assigned port numbers.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example, a method for partitioning a plurality of communication data in a network is provided. In this example, non-ephemeral server ports and non-ephemeral (server, server port) pairs are identified. Ephemeral communication data may be identified based on the non-ephemeral server ports and/or (server, server port) pairs.

In another example, kmeans data clustering is used to partition server port data to disambiguate fixed or non-ephemeral communication data or services with ephemeral communication data or services.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
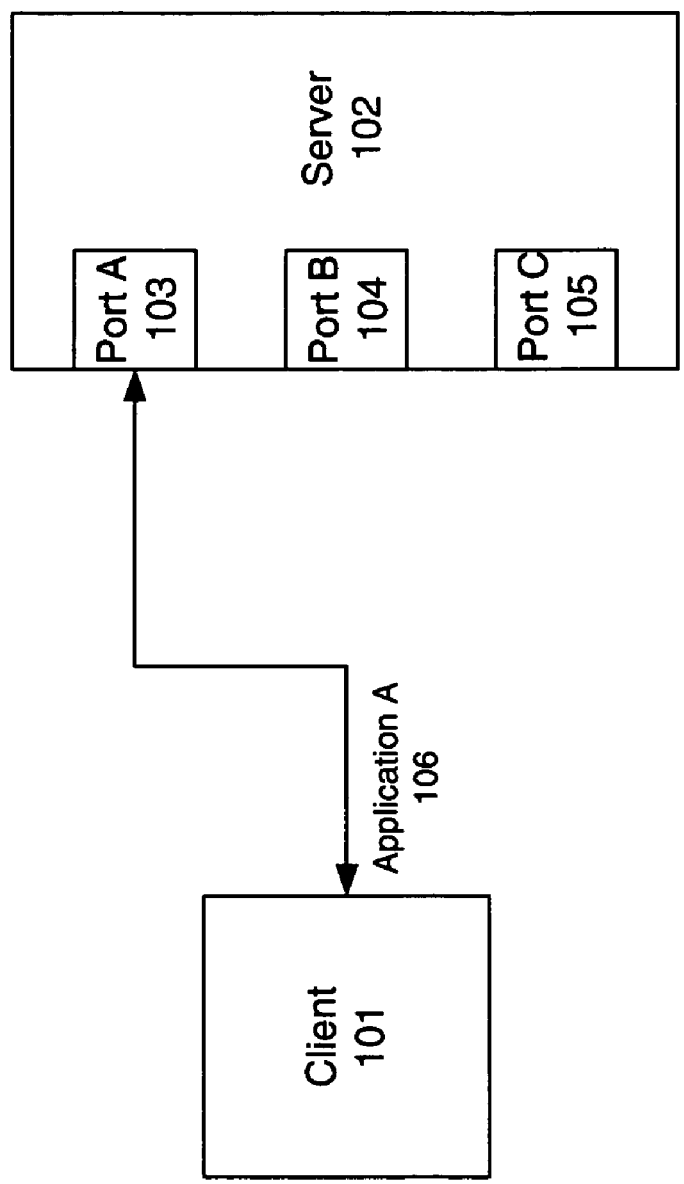
FIG. 1 illustrates an example of a client connection with a server via a server port in which various aspects of the present invention may be implemented.

In a network such as a corporate enterprise network, programs may be interconnected such that communication may be accomplished between nodes in the network. For example, a client program may communicate with a server program to request a service or otherwise exchange or share application data. In this example, a server in a network may receive a request from a client. Such communication may be accomplished via a port. For example, a server may contain a server port through which a client may communicate with the server. The server port may either be a physical connection through which to connect or may be a logical connection in which a client, for example, may communicate with the server via a network protocol. The port may further be identified by a predetermined identifier such as a port identifier or number. FIG. 1 illustrates an example of a client connection with a server via a server port. In this example, a client 101 application connects to the server 102 via the same fixed server port each time a connection is formed for the corresponding application (in this example, application A 106). In this example, the server 102 contains multiple server ports (Port A 103, Port B 104, Port C 105). The client 101 connects to the server 102 via Port A 103 each time application A 106 is offered.

As illustrated in FIG. 1, applications such as Application A 106 may address a predetermined or pre-assigned server port. In this example, application A 106 may address a particular server port as identified by a server port number each time the application accesses or addresses the server. In such a case, the application may be a fixed-server port application in which the service is offered by the server on a fixed server port. Thus, for a fixed-server port application, the identified pre-assigned server port is used each time the corresponding service is invoked. As illustrated in FIG. 1, application A 106 addresses port A 103 each time the application communicates with the server 102, wherein port A 103 is a fixed port for that application.

However, some applications do not address a fixed pre-assigned server port each time a corresponding service is requested. For example, when a connection is formed between a client and server, the server port may be assigned at the time of connection. In this example, the server port may not be the same port each time the corresponding connection is made. Rather, the server port, being assigned dynamically at the time the connection is made may be made randomly or dynamically each time. Thus, a user or policy coordinator would likely have no prior knowledge of which server port may be invoked to provide the connection for the application with the server. This is because the server port may be determined at the time of the connection rather than pre-assigned. Also, the assignment of the server port, not being predetermined and not being fixed, may vary from one connection to the next. For purposes of the present description, such a connection is termed "ephemeral."

Figure 2:
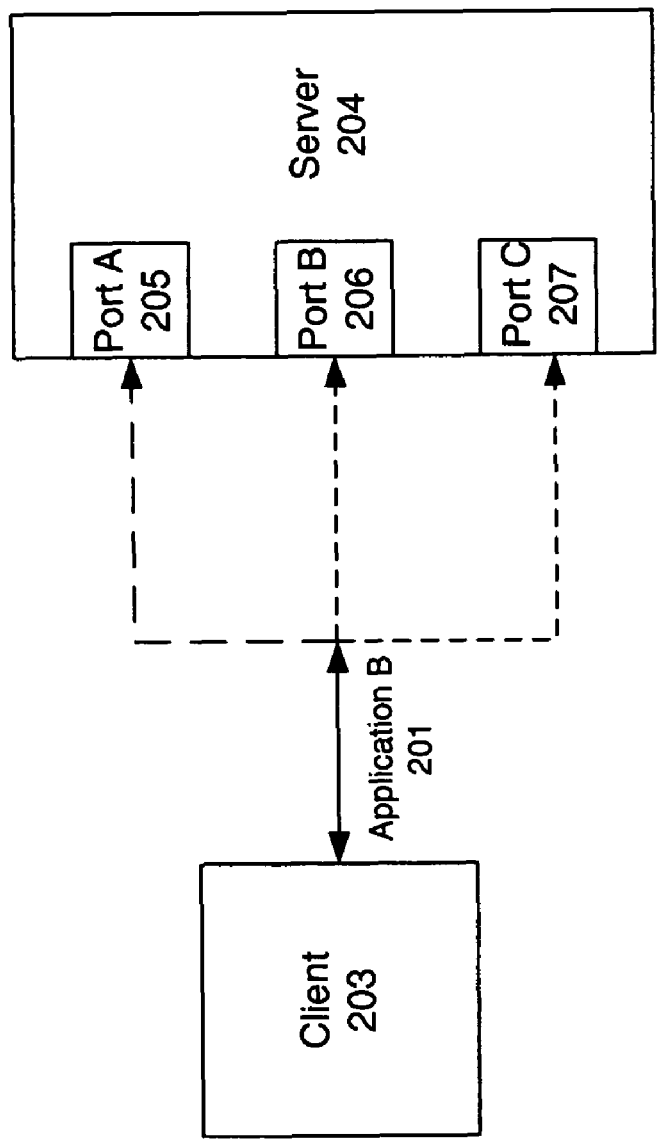
FIG. 2 illustrates an example of an ephemeral application or service in which the server port through which the application connects or communicates with the server is assigned dynamically in which one or more illustrative embodiments of the invention may be implemented.

FIG. 2 illustrates an example of an ephemeral application or service in which the server port through which the application connects or communicates with the server 204 from a client 203 is assigned dynamically. In this example, application B 201 connects to a server port. The server 204 in this example has three ports—Port A 205, Port B 206, and Port C 207. However, in this example, application B 201 is an ephemeral application such that the server port through which application B 201 connects with the server 204 may vary each time a connection is made such that the server port may be assigned dynamically at the time the connection is made. Hence, application B 201 may connect either via Port A 205, Port B 206, or Port C 207. In contrast to the example illustrated in FIG. 1, a user or policy coordinator of the system illustrated in FIG. 2 may not know the server port (e.g., Port A 205, Port B 206 or Port C 207) through which the application B 201 may connect to the server 204 from a client 203 prior to the connection being made. This is because the server port may be assigned dynamically at the time the connection is made and may vary from one connection to the next.

The present invention may be implemented in any type of network such as a large network carrying a range of diverse applications. In one example, a corporate enterprise network may carry many mission critical communications over a range of diverse applications such that identifying the various applications on the network may be difficult. In such a situation, information regarding the communication in the network may be unobtainable due to the complexity of the network which may result in problems in implementation of the network. In one example, a fixed-server port application may be identified and disambiguated from an ephemeral port application. Identification of a fixed-server port application from an ephemeral port application may be critical in network management. For example, network security may be compromised if applications and communications cannot be accurately identified or characterized because the nature of the communication would not be apparent. In other examples, it would be difficult to perform accurate network audits, compliance monitoring or application discovery without disambiguation of fixed port applications and ephemeral port applications.

In one example of the present invention, a method and system is provided for automated disambiguation of fixed-server port based services from ephemeral services. For example, data clustering may be performed to obtain partitioning of data into communications for client-server pairs over fixed server ports and communications for client-server pairs over ephemeral server ports.

In one example, fixed client-server pair communications are identified within a set of communication data and removed from the set of data. Any number of rounds of identification may be used. For example, one round of identification may be used to identify fixed client-server pair communications. Alternatively, two rounds may be used. In other examples, 10, 20, 30, 40, 50, 60, 70, 80, 90, 100, 110, 115, or more iterations or rounds may be used. For each round of identification, fixed client-server pair communications may be identified. In one example, the fixed client-server pair communications may be identified by determining the amount of communication occurring over specific server ports. After removal of the determined fixed client-server pair communications, communication over client-server pairs that communicate over multiple ports may be determined from the remaining communication data. Such data may be identified as ephemeral communications.

Figure 3:
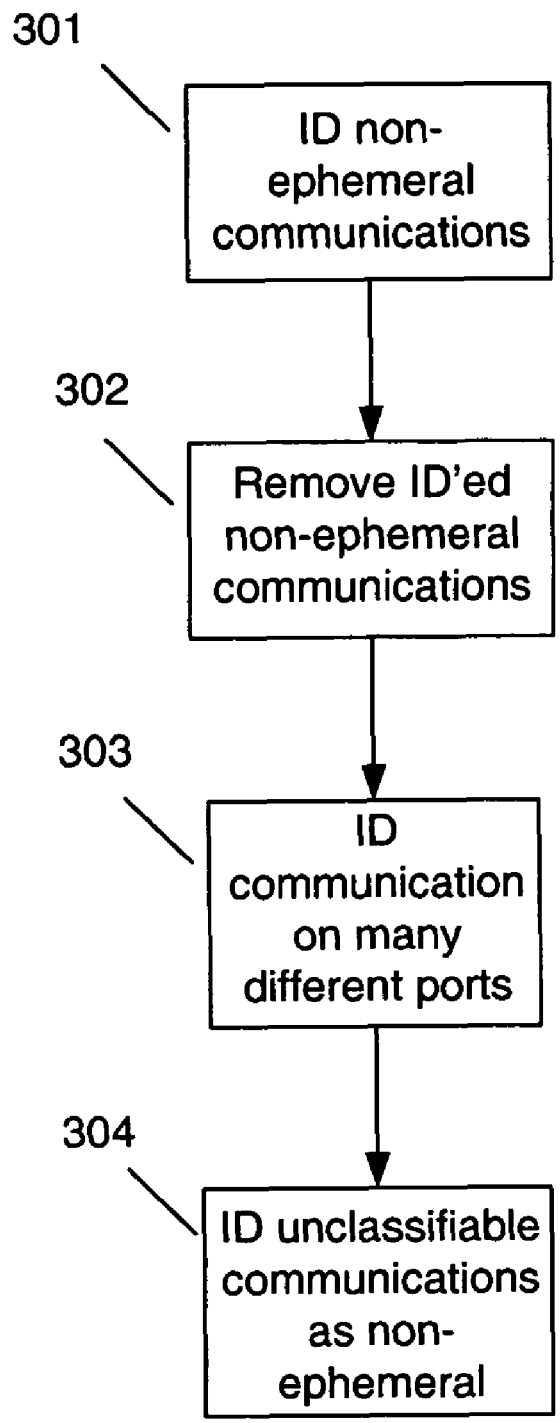
FIG. 3 is a flowchart illustrating a method for partitioning fixed server port based communications from ephemeral port communications according to at least one aspect of the present invention.

FIG. 3 is a flowchart illustrating a method for partitioning fixed server port based communications from ephemeral port communications according to at least one aspect of the present invention. In this example, non-ephemeral communications may be identified (STEP 301) and removed from the data set (STEP 302). Of the remaining communication data, communication over many ports (STEP 303) may be identified as ephemeral communications. In another example, non-classifiable data may be categorized as non-ephemeral communication (STEP 304).

In one example of the present invention, k-means data clustering may be utilized to partition fixed server port communications from ephemeral port communication. However, any clustering technique may be used. In this example, however, kmeans may be used to partition communication data into K mutually exclusive clusters and return a vector of indices indicating to which the k clusters it has assigned each communication. With kmeans, communication data may be treated as objects at a location in space that may further be partitioned in space based on clustering of the objects. Each cluster of objects within a partitioned cluster may be further defined by a centroid (i.e., the center of the cluster). The centroid may be determined based on the point in space at which the sum of distances between each point in the cluster and the centroid is minimized. The sum distances may also be minimized through an iterative process for each object in the cluster and/or over all clusters to create a set of compact clusters. This minimization process may further be controlled by various parameters such as, for example, the initial values of the cluster centroids or the maximum number of iterations of the algorithm. Alternatively, centroids may be randomly selected.

In one example of kmeans statistical clustering for partitioning of fixed server port communications from ephemeral port communications, the number of connections per port and the number of servers using each port is identified. In this example, when the number of connections per port is high and the number of servers using the corresponding port is high, it is more likely that the port is associated with popular fixed-port services that are running on multiple servers. Such popular fixed-ports may be identified, for example, via kmeans statistical clustering. The identified ports may be removed as fixed-port based communications.

Figure 4:
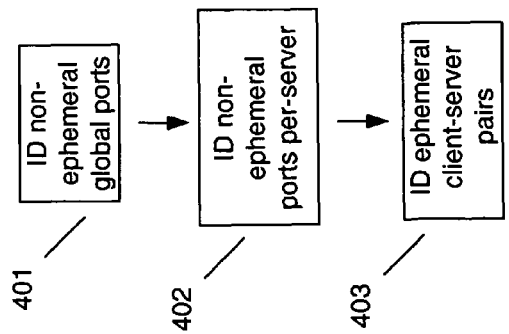
FIG. 4 is a flowchart illustrating an example of partitioning fixed-port based communications from ephemeral communications and identifying ephemeral communications in which one or more illustrative embodiments of the invention may be implemented.

FIG. 4 is a flowchart illustrating an example of partitioning fixed-port based communications from ephemeral communications and identifying ephemeral communications. In this example, non-ephemeral global ports are identified (STEP 401). For example, server ports that are associated with a high number of connections and are used by a large number of servers may be considered "heavy hitters." These ports may be associated with popular fixed-port services that are running on multiple servers, for example. In STEP 402, non-ephemeral ports per-server are identified. For example, (server, server port) pairs that are associated with significant communication may be identified. These (server, server port) pairs may correspond, for example, to servers running non-ephemeral communications over a corresponding serverport. In STEP 403, ephemeral communication over client-server ports are identified. For example, client-server pairs communicating on many ports may correspond to such pairs engaging in ephemeral communication.

Figure 5:
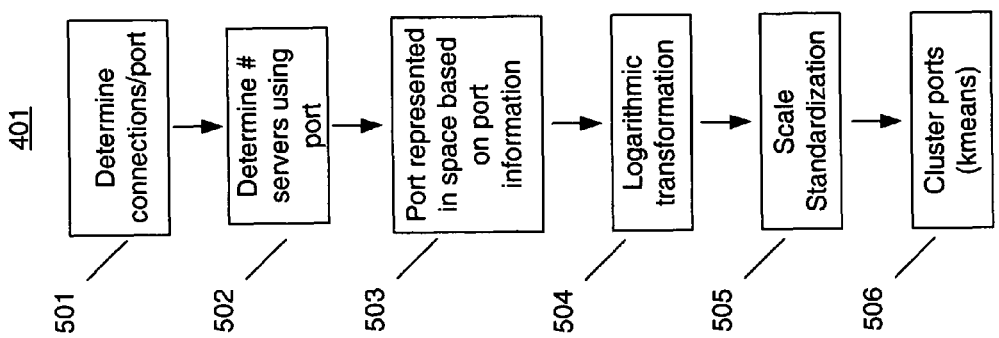
FIG. 5 is a flowchart illustrating an example of identifying non-ephemeral global ports in which one or more illustrative embodiments of the invention may be implemented.

FIG. 5 is a flowchart illustrating an example of identifying non-ephemeral global ports of STEP 401. In this example, a number of connections per port (STEP 501) and a number of servers using a corresponding port (STEP 502) are determined. The obtained values may be represented as points in 2-dimensional space. For example, each port "p" may be represented as a point in 2-dimensional space and identified by the number of connections on that server port "p" and the number of servers using that port "p". For example, a port p may be represented by $(n_p, s_p)$ wherein n, is the number of connections on the server port p and $s_p$ is the number of servers that use port p.

Given the set of points in 2-dimensional space, each of the points corresponding to a port and positioned according to the number of connections for the port and the number of servers using the port (STEP 503), the points corresponding to the represented ports may be partitioned or clustered (STEP 506). Also, the values corresponding to the points in 2-dimensional space may be transformed to a logarithmic scale to reduce the effect of outliers at the high end of the value range (STEP 504). In addition, as variables may have been described using different scales or factors, the variables may be normalized to a common scale (scale standardization) in STEP 505. This may reduce the domination of one variable over another in the clustering. Any normalization process may be used. For example, a Zscore normalization may be used such that a Zscore is determined. In one example, the Zscore is defined as follows:

$x=(v-\text{means}(v))/\text{stdev}(v)$, where v is the input variable.

Figure 6:
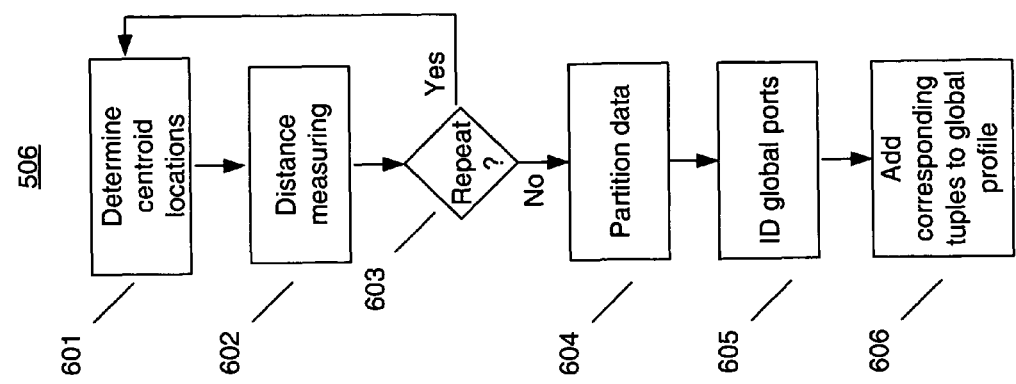
FIG. 6 is a flowchart illustrating an example of kmeans clustering of communications data associated with server ports in which one or more illustrative embodiments of the invention may be implemented.

In this example, for data clustering of the points corresponding to the ports (STEP 506), kmeans statistical clustering may be used. FIG. 6 is a flowchart illustrating an example of kmeans clustering of communications data associated with server ports. In this example, a centroid location is identified for the points in 2-dimensional space (STEP 601). In one example, the centroid location is randomly selected and distances are measured from the centroid to the points corresponding to server ports (STEP 602). This process may be repeated to address the possibility of reaching a local minimum ("YES" branch of STEP 603). In one example, a new randomly selected centroid (STEP 601) is used to determine within-cluster point-to-centroid distances (STEP 602) multiple times. For example, the process may be repeated 50, 60, 70, 80, 90, 100, 110, 115, or more times. In one example, the process is repeated 100 times. If the process is repeated multiple times, then a value may be selected from the data thus determined such as the lowest value for the total sum of within-cluster point-to-centroid distances. Thus, the data may be partitioned (STEP 604) into clusters. In this example, the number of clusters is k=2. The first cluster corresponds to points clustered around low values of the number of connections per port and a low number of servers using the port. The second cluster may correspond to points clustered around high values of the number of connections per port and a high number of servers using the port. The second cluster (i.e., the points associated with high values for the number of connections and number of servers) may determine the global ports (STEP 605). The global ports in this example may represent ports associated with fixed-port services running on multiple servers according to a designated transport protocol. A global profile may be created based on the global ports thus identified. For example, communication between a client and server on a global server port with the designated transport protocol may be added to the global profile. Each communication may be represented as a tuple (c,s,p,prot), wherein c represents the client, s represents the server, p represents the port and prot represents the transport protocol. The corresponding tuple may be added to the global profile (STEP 606).

Figures 7, 8:
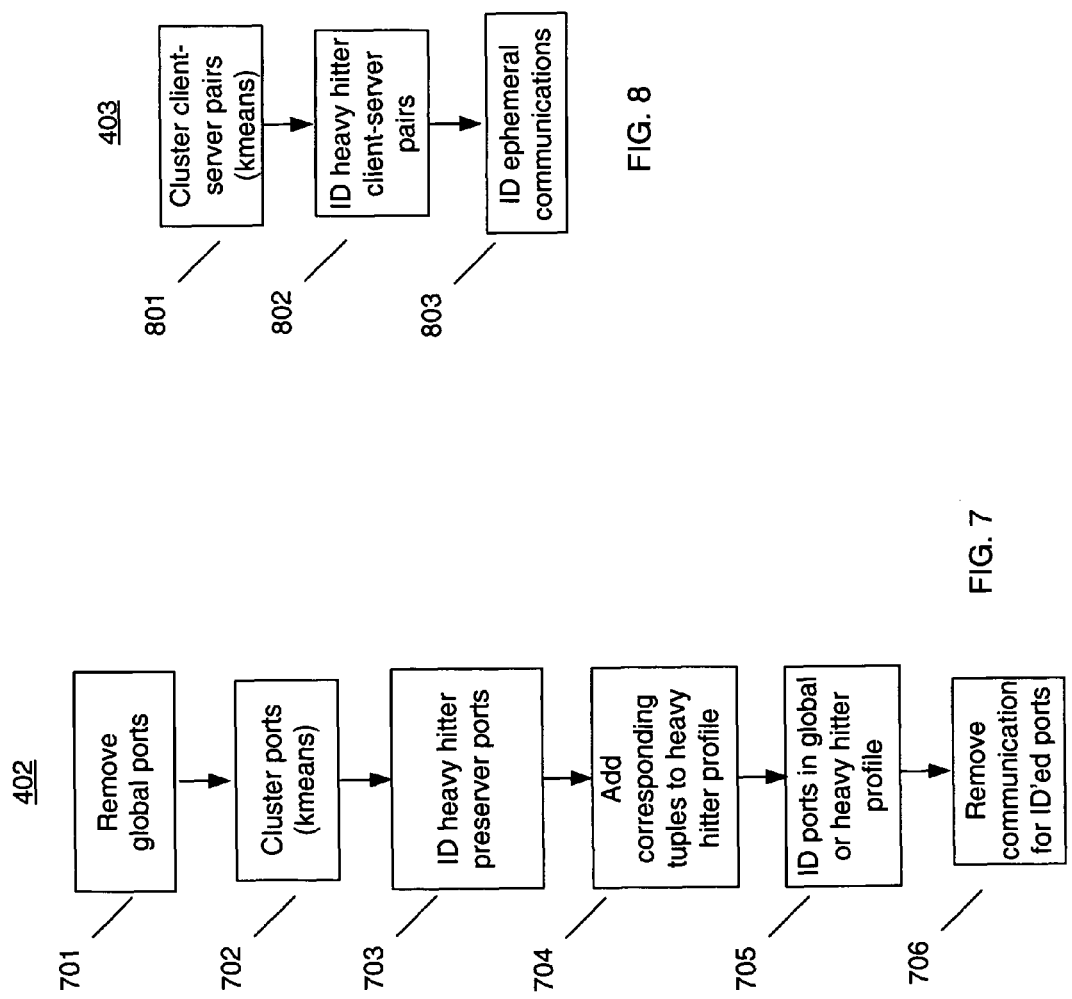
FIG. 7 is a flowchart illustrating an example of identifying non-ephemeral ports per-server in which one or more illustrative embodiments of the invention may be implemented.
FIG. 8 is a flowchart illustrating an example of identifying ephemeral client-server pairs for communication in which one or more illustrative embodiments of the invention may be implemented.

FIG. 7 is a flowchart illustrating an example of identifying non-ephemeral ports per-server of STEP 402. In this example, the global ports identified in STEP 605 are removed (STEP 701) and data clustering (e.g., kmeans statistical clustering) is performed on the remaining (server, server port) pairs (STEP 702). Data clustering on the remaining (server, server port) pairs provides clustering or partitioning of those (server, server port) pairs having significant communications and corresponding to servers running non-ephemeral communications of the server port. In this example, kmeans clustering is performed with k=2 based on the number of connections associated with each server-port pair. Based on kmeans clustering, "preserver ports" are identified which corresponds to a heavy hitter cluster of server-serverport pairs (i.e., high number of communications from the server-port pair) (STEP 703).

In this example, each of the ports p, represented by the total number of connections on a corresponding port and the number of servers that use the corresponding port, is partitioned according to the number of connections. Based on the identified (server, server port) pairs, corresponding communication between a client and server over the identified server-port pair with a designated transport protocol may be added to a heavy hitter profile (i.e., (server, server port) pairs associated with significant communication and running non-ephemeral communications over the serverport). Each communication may be represented as a tuple (c,s,p,prot), wherein c represents the client, s represents the server, p represents the port and prot represents the transport protocol. The corresponding tuple may be added to the heavy hitter profile (STEP 704).

Also in this example, ports that are included either in the global profile or the heavy hitter profile may be non-ephemeral ports or sever-port pairs (STEP 707). Communications associated with the identified ports (i.e., communications over global ports or heavy hitter (server, server port) pairs) may be removed as non-ephemeral communications (STEP 706).

FIG. 8 is a flowchart illustrating an example of identifying ephemeral client-server pairs for communication of STEP 403. In this example, client-server pairs are clustered using kmeans data clustering (STEP 801) to identify heavy hitter and non-heavy-hitter clusters of data points (STEP 802). Data clustering in this example may be based on the number of ports on which the client-server pairs communicate and identifies a set of ephemeral communications as those client-server pairs that are heavily used in communication. For example, client-server pairs that communicate on many ports may be identified from remaining communications (i.e., client-server pairs engaging in ephemeral communications). In one example, kmeans clustering may be used to cluster the client-server pairs into a heavy-hitter and/or non-heavy-hitter cluster based on the number of ports the pairs communicate on.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed:

1. A method for partitioning a plurality of communication data relating to communication between at least one client computer and at least one server in a network, the plurality of communication data being associated with a plurality of ports and comprising ephemeral communication data, the method comprising:

determining a first parameter for each port associated with the plurality of communication data, the first parameter corresponding to a number of connections on each port;

determining a second parameter for each port associated with the plurality of communication data, the second parameter corresponding to a number of servers using each port;

utilizing the first parameter and the second parameter for each port associated with the plurality of communication data to represent each port as a point in a two-dimensional space such that each port is represented by a set of points;

applying a first data clustering to the set of points;

based on the first data clustering, automatically identifying a portion of the set of points for which the first parameter and the second parameter are high, wherein ports corresponding to the portion of the set of points comprise global ports associated with first non-ephemeral communication data;

eliminating the portion of the set of points from the set of points such that first communication data associated with the global ports is removed from the plurality of communication data;

after removing the first communication data from the plurality of communication data, determining server, port pairs associated with the plurality of communication data remaining after the first communication data is removed;

determining a third parameter for each server, port pair, the third parameter corresponding to a number of connections associated with each server, port pair;

based on the third parameter for each server, port pair, applying a second data clustering to the server, port pairs;

based on the second data clustering, automatically identifying a portion of the server, port pairs associated with a high number of connections, wherein the portion of the server, port pairs associated with the high number of connections comprises heavy hitter server, port pairs associated with second non-ephemeral communication data;

eliminating second communication data associated with the heavy hitter server, port pairs from the plurality of communication data remaining after the first communication data is removed; and automatically identifying at least a portion of the plurality of communication data remaining after the first communication data and the second communication data are removed as the ephemeral communication data.

2. The method of claim 1, wherein the first data clustering comprises first kmeans data clustering.

3. The method of claim 1, wherein the second data clustering comprises second kmeans data clustering.

4. The method of claim 2, further comprising transforming the first parameter and the second parameter to a logarithmic scale.

5. The method of claim 2, further comprising normalizing the first parameter and the second parameter.

6. The method of claim 2, wherein the first kmeans data clustering comprises:

determining a location of each port based on a value of the first parameter and the second parameter corresponding to each port;

determining a distance from the location of each port from a reference location; and partitioning each port in a cluster based on the value of the first parameter and the second parameter.

7. The method of claim 6, wherein the first parameter of the portion of the set of points is greater than a threshold value.

8. The method of claim 7, wherein the threshold value is based on the partitioning of each port in the cluster.

* * * * *